United States Patent [19]

Pearce et al.

[11] Patent Number: 5,379,866
[45] Date of Patent: Jan. 10, 1995

[54] LIGHT-WEIGHT WHEEL ASSEMBLY AND STATIC BRAKE FOR WHEELCHAIRS

[75] Inventors: Tony M. Pearce, Alpine; Terry V. Pearce, Sandy; Robert K. Rasmussen, Alpine; Herbert Mudrow, Kaysville, all of Utah

[73] Assignee: Genesis Composites, Inc., Salt Lake City, Utah

[21] Appl. No.: 94,718

[22] Filed: Jul. 20, 1993

[51] Int. Cl.⁶ ............................................. B60T 1/06
[52] U.S. Cl. ...................... 188/2 F; 188/17; 188/31; 188/69; 280/304.1; 301/55
[58] Field of Search ............... 188/2 F, 31, 17, 69, 188/18 R, 68, 60, 24.22, 24.11, 19, 20, 82.1, 265, 83, 24.18; 280/304.1, 250.1; 301/55–61, 104, 80, 6.1; 192/6 R, 5

[56] References Cited

U.S. PATENT DOCUMENTS

| Re. 32,242 | 9/1986 | Minnebracker | 280/242 WC |
|---|---|---|---|
| D. 306,712 | 3/1990 | Friedrich | D12/128 |
| 2,425,574 | 8/1947 | Stewack | 188/31 |
| 2,824,597 | 2/1958 | Lerman | 155/30 |
| 3,356,185 | 12/1967 | Isaacks | 188/31 |
| 3,618,968 | 9/1971 | Green | 280/36 |
| 3,897,857 | 8/1975 | Rodaway | 188/2 F |
| 3,964,786 | 6/1976 | Machuda | 297/330 |
| 4,280,595 | 7/1981 | Timms et al. | 188/31 |
| 4,431,076 | 2/1984 | Simpson | 180/65 R |
| 4,489,955 | 12/1984 | Hamilton | 280/242 |
| 4,593,929 | 6/1986 | Williams | 280/690 |
| 4,598,944 | 7/1986 | Meyer | 297/183 |
| 4,652,005 | 3/1987 | Hartwell | 280/242 |
| 4,733,755 | 3/1988 | Manning | 188/31 |
| 4,768,797 | 9/1988 | Friedrich | 280/242 |
| 4,953,913 | 9/1990 | Graebe | 297/459 |
| 4,989,890 | 2/1991 | Lockard | 280/42 |
| 5,028,065 | 7/1991 | Danecker | 280/250.1 |
| 5,060,962 | 10/1991 | McWethy | 280/304.1 |
| 5,120,071 | 10/1992 | Thibault | 280/474 |
| 5,176,393 | 1/1993 | Robertson | 280/250 |
| 5,203,433 | 4/1993 | Dugas | 188/31 |

Primary Examiner—Douglas C. Butler
Attorney, Agent, or Firm—Daniel P. McCarthy

[57] ABSTRACT

A lightweight wheel assembly intended primarily for use on wheelchairs including an injection-moldable fiber-reinforced plastic push rim, injection-moldable fiber-reinforced plastic wedge-bottom spokes, and a lockable static in-hub brake. Important advantages of the invention include very light weight compared to prior art wheel assemblies while achieving the high component strength desired, shock absorption qualities beneficial to wheelchair users not provided by other wheel assemblies, a convenient and easy-to-operate positive-engaging static brake, and components which may be made from the inexpensive injection molding process.

17 Claims, 7 Drawing Sheets

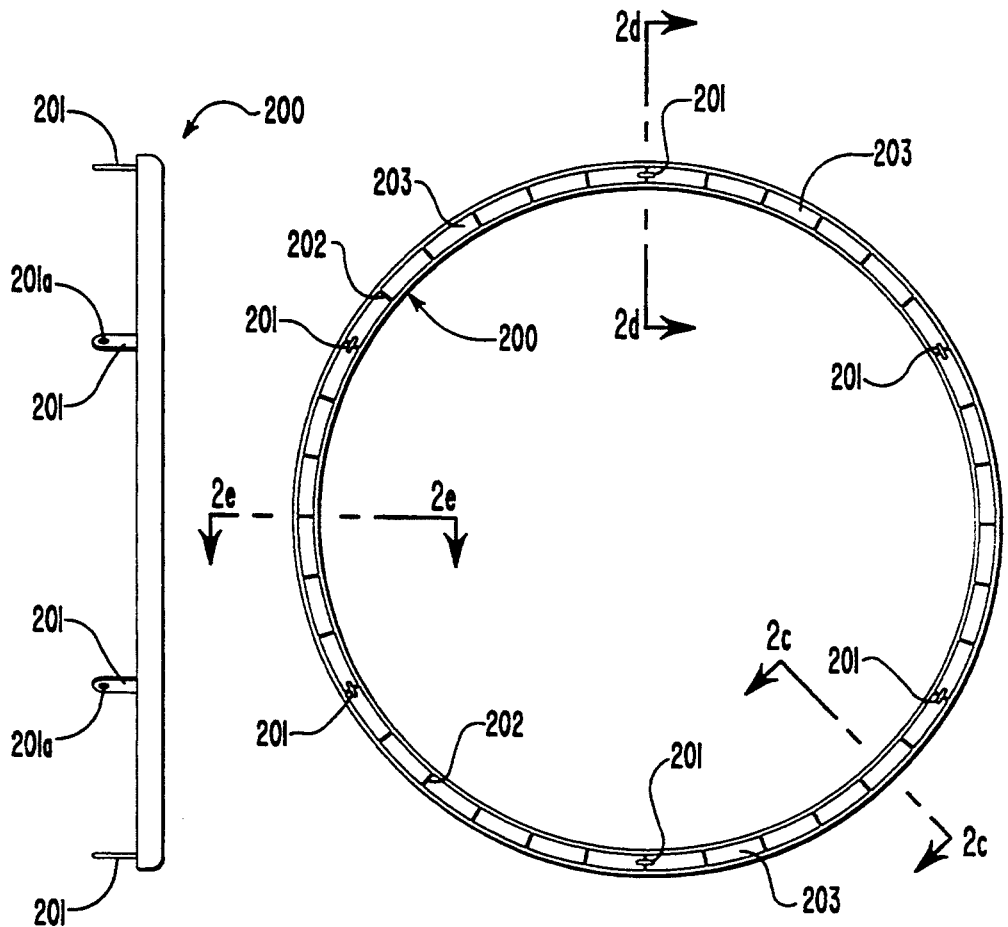
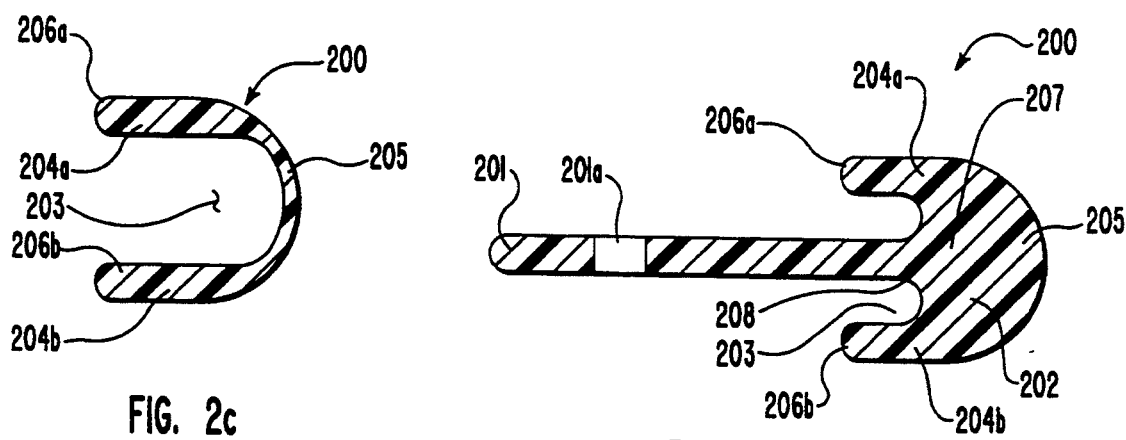
FIG. 2a  FIG. 2b
FIG. 2c  FIG. 2d

LIGHT-WEIGHT WHEEL ASSEMBLY AND STATIC BRAKE FOR WHEELCHAIRS

I. BACKGROUND OF THE INVENTION

A. Field of the Invention

This invention relates to the field of wheels and brakes for wheelchairs. More particularly, this invention relates to a lightweight wheel and brake assembly including an injection-moldable fiber-reinforced plastic push rim, injection-moldable fiber-reinforced plastic wedge-bottom spokes, and a lockable static in-hub brake.

B. The Background Art

Typical prior art rear wheelchair wheels typically include a steel rim, a steel push ring, a steel hub, steel spokes, a rubber tire and tube, and a lever positionable against the tire to serve as a brake. Prior art wheelchair wheel assembles typically weigh 12 to 14 pounds per pair. Because users of wheelchairs frequently suffer from a weakened physical condition, this weight can be a great burden to both the user of the wheelchair and to other persons pushing or lifting the wheelchair. As a result, wheel assemblies have become a target for those interested in designing a lighter wheelchair. Aluminum alloy wheels including an aluminum push ring, an aluminum rim, an aluminum hub, steel spokes, a rubber tire and tube and brass nipples are the preferred light weight prior art wheel chair wheel assembly, usually weighing 7½ to 9 pounds per pair. The wheelchair wheel assembly of the present invention weighs only 5.5 pounds per pair, a 61% reduction in weight over prior art steel wheels assemblies and a 39% reduction in weight over aluminum alloy wheel assemblies. This weight reduction can result in substantial gains in mobility for the wheelchair user, not only in the use of the wheelchair, but also in lifting the wheelchair to place it into an automobile.

Another problem with prior art wheelchair wheel assemblies is that they transmit most vibrations and shock from the ground over which the wheelchair is travelling to the wheelchair rider, doing little to absorb such shock or vibration, particularly if a solid rather than a pneumatic tire is used. Vibrations and shocks are transmitted from the ground through the wheelchair wheel assembly and into the wheelchair frame jostling, shaking, vibrating and bouncing the rider in the wheelchair. Users of wheelchairs often suffer from pre-existing spinal injuries, pressure sores, skin abrasions, and other maladies and discomforts, as well as being generally injury-prone, and cannot tolerate the additional trauma of riding in a wheelchair that provides a bumpy, vibrating ride. The trauma of such a ride can aggravate existing conditions and cause further injury. The wheelchair wheels of this invention reduce the transmission of vibrations and shocks through a dampening action inherent in some materials such as fiber-reinforced plastic or composite materials.

Another problem with prior art wheelchair wheel assemblies is that they are difficult to statically brake or lock into position at times when the rider or attendant does not want the wheelchair to roll. Prior art attempts to accomplish this with a "brake" that consists of a mechanism with a bar or plate that indents into the tire to hold the wheelchair in place, the other end of the mechanism being attached to the wheelchair frame. The prior art brakes are heavy, being made of weighty steel components. The prior art brakes are also difficult for many riders to operate because significant hand strength is required to operate the brake mechanism. Prior art brakes are usually located in a difficult to reach location on the wheelchair, making their use doubly problematic for most wheelchair users. And prior art brakes are only partially effective at positively securing a wheelchair in place—only a small amount of force is required to roll a wheelchair with a prior art brake applied.

The wheelchair wheel assembly of this invention includes an optional brake that is located inside the wheel hub, with a handle conveniently located on the outside of the hub. The brake of the present invention is effective, requiring substantial force to roll the wheels when the brake of the invention is engaged. The brake is easy to operate, in that very little force or strength is required to manipulate the handle to engage the brake and the brake is very light weight in comparison with prior art brakes.

II. SUMMARY OF THE INVENTION

It is an object of the invention to provide a wheel assembly for wheelchairs that is substantially lighter than typical prior art wheelchair wheel assemblies. This is accomplished by use of injection-moldable fiber-reinforced plastic materials in fabrication of portions of the wheel assembly, including the push ring and spokes.

It is an object of the invention to provide a wheelchair wheel assembly that absorbs shock and vibration generated as a wheelchair moves across uneven surfaces. The composite materials used to fabricate the wheel assembly of the invention have inherent shock-reduction and vibration-absorbing qualities that reduce transmission of vibration and bumpiness of an uneven road surface to the wheelchair user.

It is a further object of the invention to provide a wheelchair brake located inside the wheelchair hub which is convenient and easy for the wheelchair user to operate and which virtually locks the wheels of the wheelchair in place when engaged.

III. BRIEF DESCRIPTION OF THE DRAWINGS

FIG. 2a depicts a side view of one preferred embodiment of the push ring used in the invention.

FIG. 2b depicts an elevation view of the wheelchair side of one preferred embodiment of the push ring used in the invention.

FIG. 2c depicts a sectional view of the push ring showing its general shape in cross section.

FIG. 2d depicts a sectional view of the push ring showing its general shape at the intersection of an attachment tab and a stiffener rib.

IV. DESCRIPTION OF THE PREFERRED EMBODIMENTS

Figure 1:
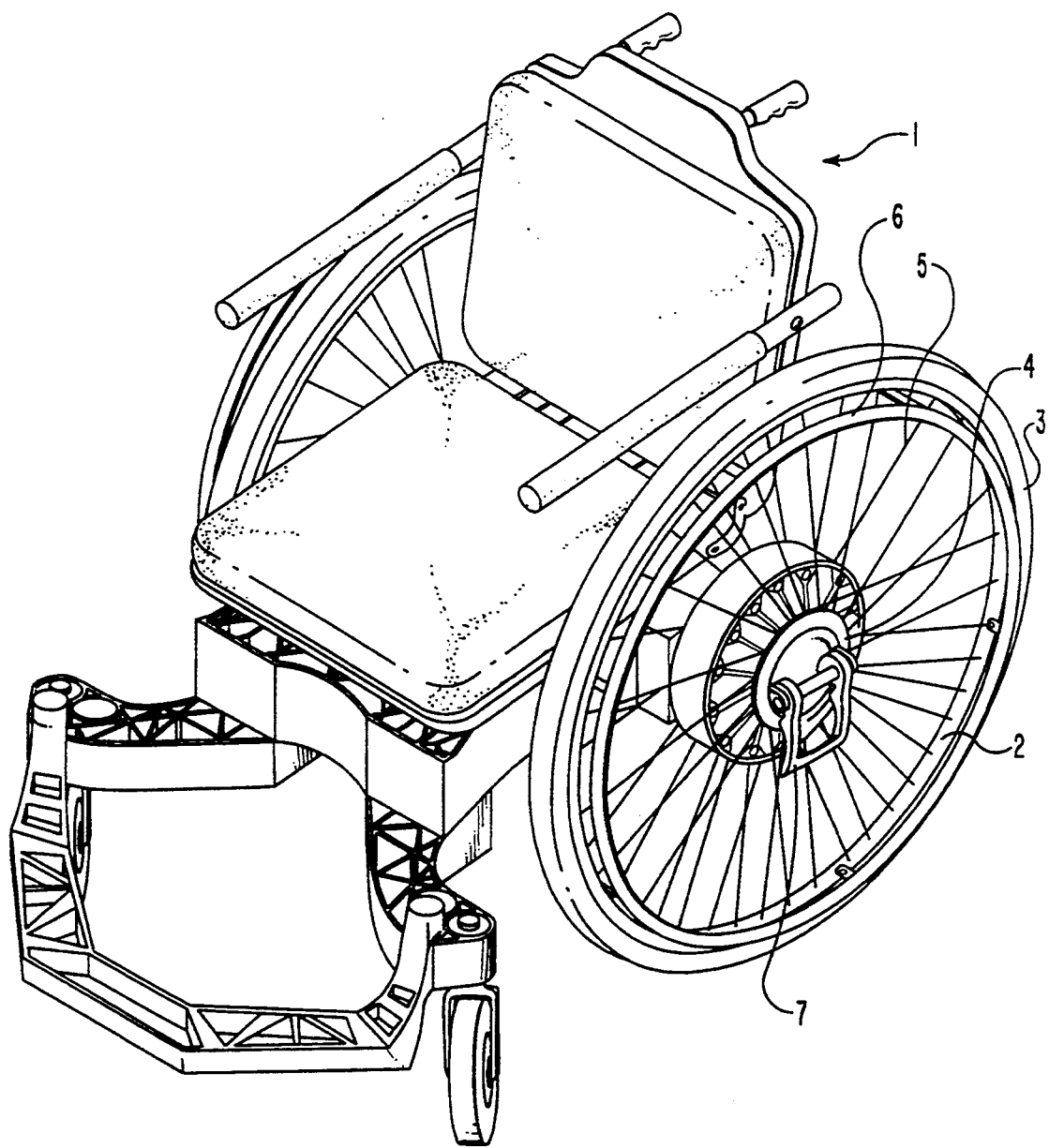
FIG. 1 depicts a perspective view of the wheelchair wheel assembly of one preferred embodiment of the invention in use on a wheelchair.

Referring to FIG. 1, one preferred embodiment of the c-shaped push ring, wedge-bottom spokes, and in-hub brake of the invention are shown in use in a wheelchair. A wheelchair 1 is shown using a standard bicycle rim 2 and bicycle tire 3. The rim 2 is connected to hub 4 by a plurality of wedge-bottom spokes 5 made from composite materials. A c-shaped push ring 6 of the invention is mounted to the rim 2 to allow the wheelchair user to propel himself. Integral to the interior of the hub 4 is an in-hub static brake of the invention. The brake has an engagement lever 7 conveniently located for manipulation by the wheelchair user.

A. PUSH RING

FIG. 2a depicts a side view of one preferred embodiment of the push ring used in the invention. The push ring 200 includes attachment tabs 201 with mounting holes 201a. FIG. 2b depicts an elevation view of the wheelchair side of the push ring 200 of FIG. 2a. The push ring 200 is generally circular in shape and includes a plurality of attachment tabs 201 and a plurality of stiffener ribs 202. Between stiffener ribs 202 are hollow voids 203. In the preferred embodiment of the invention, six (6) attachment tabs are included on the push ring 200 spaced 60 degrees apart, and thirty-six (36) stiffener ribs 202 are included on the push ring 200 spaced 10 degrees apart. The attachment tabs 201 of the preferred embodiment are approximately 0.135 inches thick, 0.50 inches wide, protrude approximately 1.40 inches from the push ring 200, and includes a mounting holes 201a. The preferred inside diameter of the push ring 200 is 20.65 inches and the preferred outside diameter is 20.919 inches. The dimensions listed herein as well as the number, spacing and type of attachment tabs 201 and the number, spacing and existence of stiffener ribs 202 may be varied widely in other embodiments of the invention.

FIG. 2c depicts a sectional view of the push ring. The push ring 200 includes a body portion 205 that is semicircular and relatively thin at its midsection, but becomes thicker on its generally straight protruding sides 204a and 204b and terminates at rounded ends 206a and 206b, forming a c-shaped cross-section with a void or gap 203 at the interior of the c-shape between sides 204a and 204b. The approximate width of gap 203 is 0.485 inches.

FIG. 2d depicts another sectional view of the push ring 200, showing the general shape of the push ring 200 at the cross-sections of an attachment tab 201 and a stiffener rib 202. The attachment tab 201 is shown protruding from the push ring 200 and includes a mounting hole 201a. Sides 204a and 204b extending from body 205 and ends 206a and 206b are shown. Gap 203 is substantially smaller than in FIG. 2c due to the presence of the stiffener rib 202 between sides 204a and 204b in the center 207 of the c-shape of the push ring. The attachment tab 201 joins the side 204a with a curved shape 208 near the center 207. The approximate distance between sides 204a and 204b is 0.485 inches and the approximate distance from the far point of the body 205 to the start of curved shape 208 is 0.45 inches.

Figure 2E:
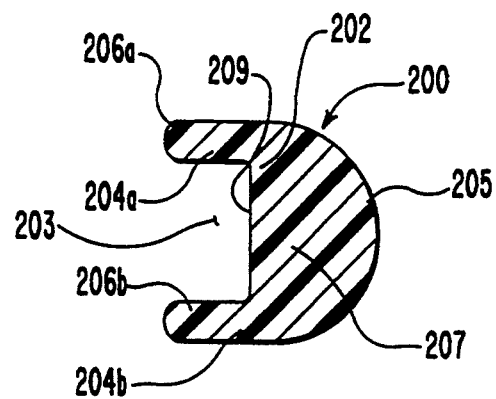
FIG. 2e depicts another sectional view of the push ring showing its general shape at a stiffener rib.

FIG. 2e depicts another sectional view of the push ring 200 showing the general shape of the push ring 200 at a stiffener rib 202. Body 205 is shown extending into sides 204a and 204b and ends 206a and 206b. The rib 202 extends across center 207 resulting in a flat edge 209 and small gap 203. The approximate distance between sides 204a and 204b is 0.485 inches and the approximate distance between edge 209 and the far point of the body 205 is 0.45 inches.

In the preferred embodiment, the push ring is made from injection molded discontinuous fiber reinforced thermoplastic, or any other fiber-reinforced plastic (FRP) or other composite or other moldable structural materials. The c-shaped or open ended cross-sectional design of the invention accommodates fabrication by injection molding because two split mold halves can be brought together to mold the push ring without leaving any undesirable solid or heavy sections of molded material. Because the push ring is made from FRP in the preferred embodiment, it weighs much less than a metal push ring due to a lower density of material. Prior art push rings are made from hollow steel, aluminum, or titanium tubular rings with circular cross-sections. In the preferred embodiment, the material used to manufacture the push ring is thermoplastic (as opposed to thermoset plastic) filled with reinforcing fibers. Many materials suitable for injection molding are known in the art. In alternative embodiments of the invention, other materials could be used for manufacture of products embodying the invention. Thermoplastic without reinforcing fibers, injectable metals, injectable quick-setting fiber-reinforced thermoset plastics, or any other injectable, quickly solidifying structural material could be used in other embodiments of the invention, such as NYLON 6 and NYLON 6-6 (generically referred to as polyamides) available from DuPont, PPS (polyphenelyne sulfide), high density polyethylene and polypropylene. The reinforcing material used in the preferred embodiment of the invention is graphite (carbon) fiber commonly available commercially. The preferred embodiment uses standard modulus moderate strength TORAY T-700 (generically referred to as graphite) and NYLON 6-6 thermoplastic. An equally suitable standard modulus standard strength fiber which could be used is HERCULES AS-4 (generically referred to as "graphite fiber"). Alternatively, intermediate modulus high strength graphite fibers such as TORAY M 30 and HERCULES IM-7 (generically referred to as "graphite fiber") may be used. Aramid fibers such as KEVLAR 49 and TWARON (generically referred to as "aramid fiber") as well as glass fibers such as E-GLASS and S2 GLASS (generically referred to as fiberglass) available from Dow-Corning may be used. The thermoset plastic used in the preferred embodiment of the invention is NYLON 6-6 (polyamide) available from DuPont. Alternatively, PPS (polyphenaline sulfide), PET (polyester teraphalate), ABS (acrylobutadiene styrene) or other structural thermoplastics could be used.

Various other preferred embodiments of the invention could use any other structural material, eliminate or modify the stiffener ribs, attach tabs at locations other than that shown in the drawings or cross sectional shapes other than a c-shape. For example, a cross-sectional semicircle, V-shape, or an open sided polygon with any number of sides could be used. An open side in cross-section is key to the invention because it enables manufacturing by injection molding. The elongated sides 204a and 204b shown in the drawings provide additional surface area for gripping the push ring and slowing the speed of the chair, but are optional.

The push ring may be used to slow a wheelchair by the user applying hand pressure to the push ring. The push ring of the invention, being made of FRP, experiences less heat build-up during slowing because of the lower heat transfer coefficient of FRP. The push ring of the invention is also lighter than prior art push rings both because of its c-shape and the low specific gravity of FRP (i.e. lower than aluminum or steel). The invention also provides a greater gripping surface for use during pushing or slowing than typical prior art push rings. Finally, design of the push ring of the invention permits attachment tabs and reinforcing ribs to be integrally injection molded in the push ring. On metal push rings, attachment tabs must be welded on, resulting in increased manufacturing cost.

B. IN-HUB STATIC BRAKE

Figure 3A:
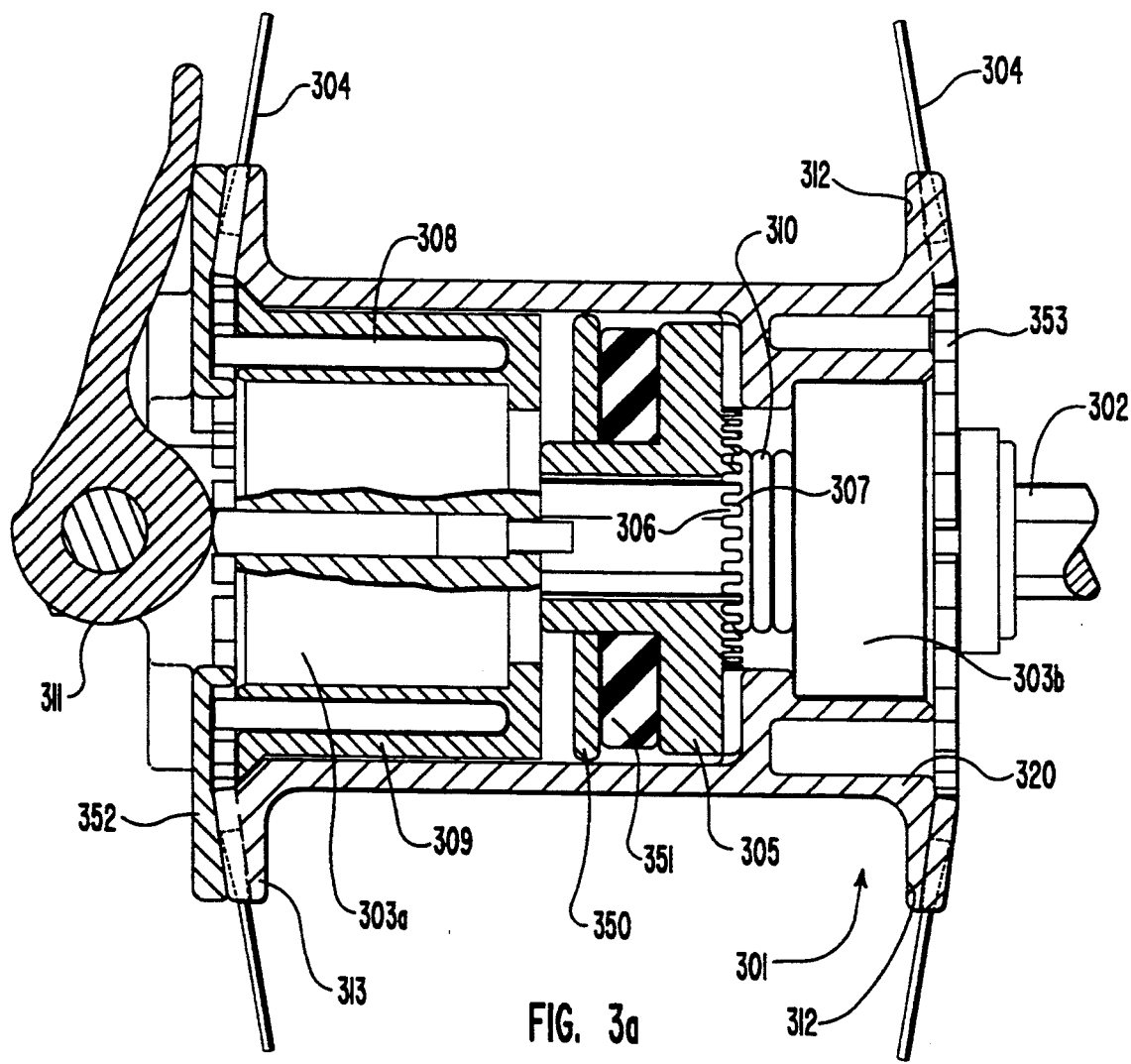
FIG. 3a depicts the parts comprising the in-hub brake assembly of one preferred embodiment of the invention.
Figure 3B:
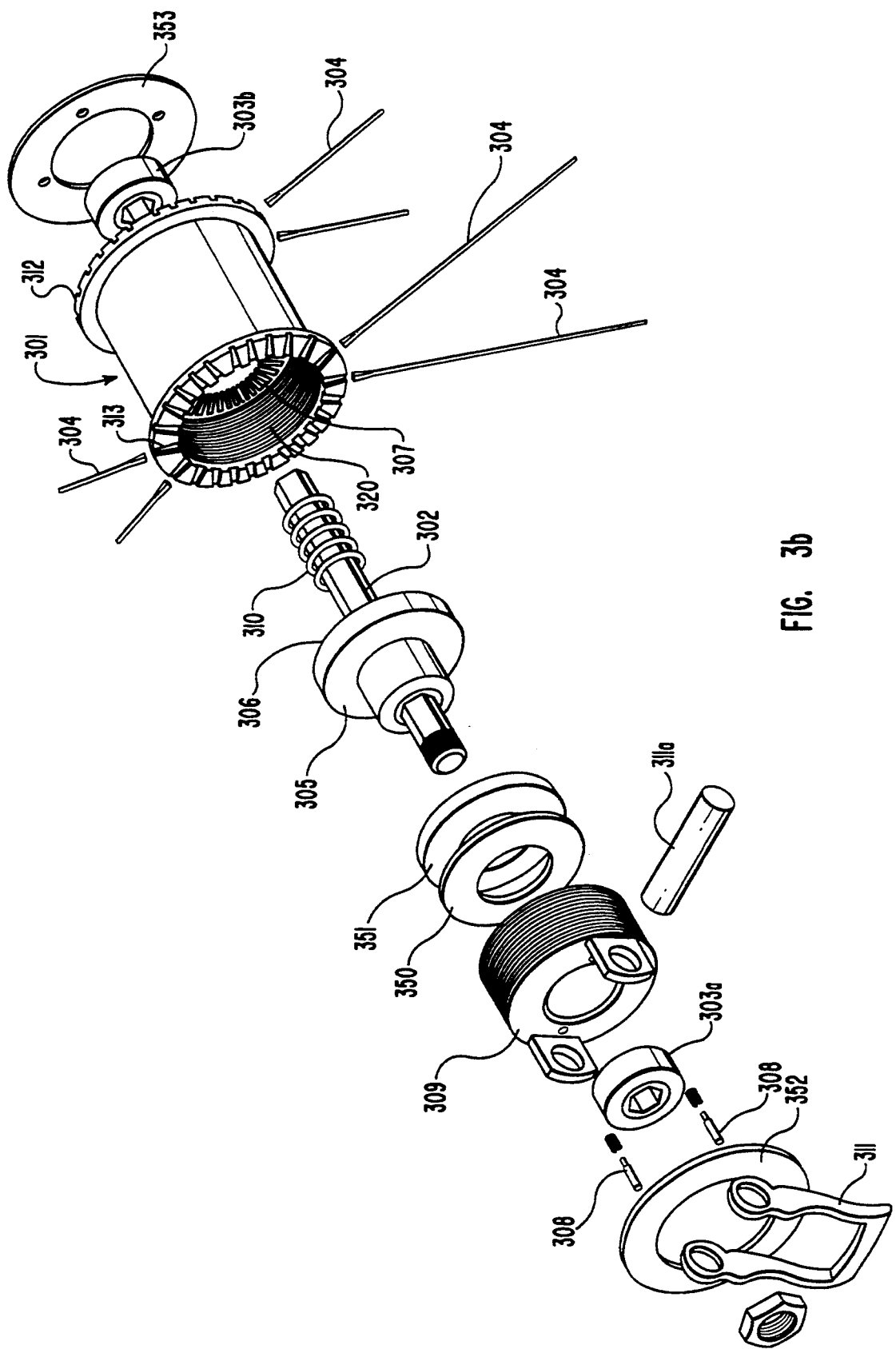
FIG. 3b depicts a parts explosion of the in-hub brake of one preferred embodiment of the invention.

FIGS. 3a and 3b depict a preferred embodiment of an in-hub static brake of the present invention. The brake is a static, stationary or locking brake for use in causing a wheelchair to remain stationary after it is already stopped, but not for use in stopping a moving wheelchair.

Referrings to FIG. 3a and 3b, a cut-away view and a parts explosion of the wheel hub revealing the components of one preferred embodiment of the invention are shown respectively. The hub 301 is essentially a cylindrical shell with outwardly projecting lips 312 and 313 onto which wheel spokes 304 may be mounted. The general configuration of the hub 301 has some similarities to prior art bicycle and automobile hubs in its basic concept. The hub 301 of the present invention is configured, however, to accommodate manufacture by split molding because two mold cores can meet at the empty central portion of the hub for molding. This permits the hub to be made from the same composite materials as the push ring and the spokes of the present invention, thereby enjoying the advantages of light weight, strength, shock resistance and low cost. Alternatively, the hub may be made from metal, aluminum alloy or other materials.

Mounted in the hub by threads is an activating pin collar 309. The collar 309 serves as a guide for the brake activating pins 308 and as a retainer for one of the axle bearings 303. Hexagonal axle 302 extends through the hub 301 and permits rotation of the hub 301 about the axle 302 by bearings 303a and 303b. Also shown are a washer 350 and foam spring 351 positioned between sliding ratchet 305 and the inner surface of the hub 320. Hub caps 352 and 353 for keeping the spokes 304 in place on the hub 301 are shown.

When handle 311 is activated by the user of the wheelchair, a cam-like action pushes activating pins 308 against washer 350, which bears against foam spring 351, which bears on sliding ratchet 305, bringing the ratchet face 306 of the sliding ratchet 305 into contact with the ratchet face 307 on the interior of the hub 320. If the ratchet faces 306 and 307 do not immediately mesh and engage, foam spring 351 will keep pressure on them so that they will engage with any rotational movement of the hub 301 with respect to the axle 302. Sliding ratchet 305 cannot turn with respect to axle 302 because of the hexagonal interface, and axle 302 cannot turn relative to the wheelchair frame due to a like interface, so at this point the brake is firmly engaged. The sliding movement of the sliding ratchet 305 along the longitudinal axis of the axle 302 also compresses rebound spring 310 against an axle bearing 303b. When the handle 311 is moved back to a disengaged position, the rebound spring 310 bears against the inner race of bearing 303b to exert force on the sliding ratchet 305 causing it to slide and move ratchet faces 306 of the sliding ratchet 305 away from ratchet faces 307 of the hub, disengaging the brake. Movement of the handle 311 also permits the pins 308 to withdraw from their position locking the sliding ratchet 305 in an engaged position. At this point the brake is disengaged. The sliding ratchet, ratchet faces, and related components are a means for exerting a positive-engaging static braking force with respect to said axle on the interior of said hub.

Figure 3C:
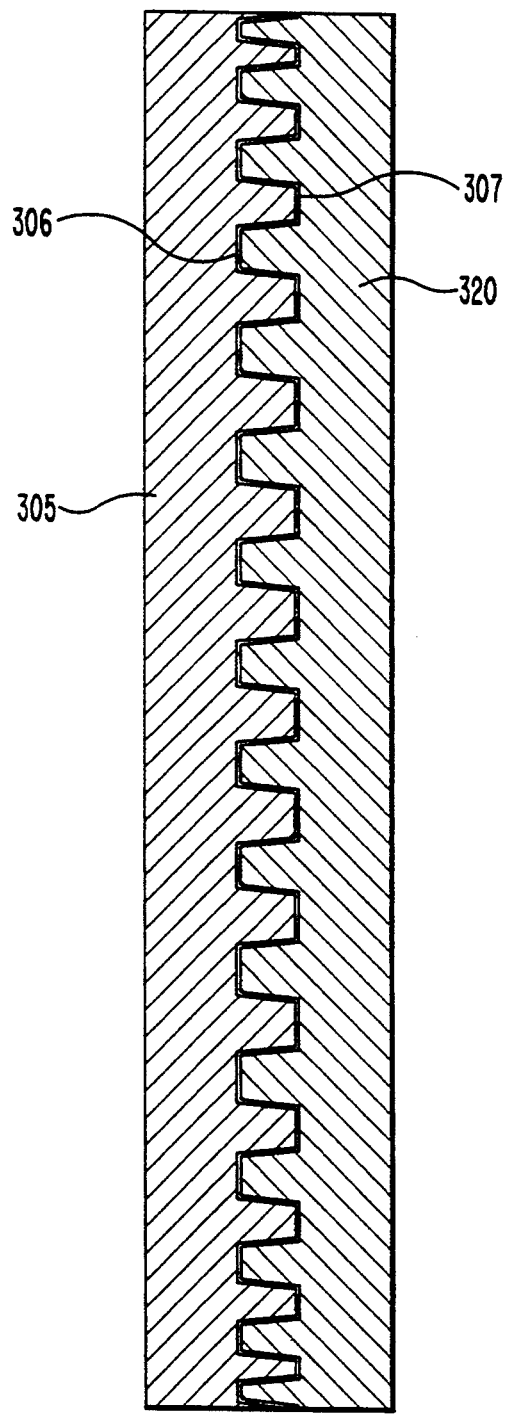
FIG. 3c depicts one preferred embodiment of opposing ratchet faces used in the in-hub brake.

FIG. 3c depicts one preferred embodiment of the ratchet faces 306 and 307 of the sliding ratchet 305 and hub 320 respectively. The ratchet faces shown are approximately square to provide flat contact surfaces and hence a positively locked brake.

Figure 3D:
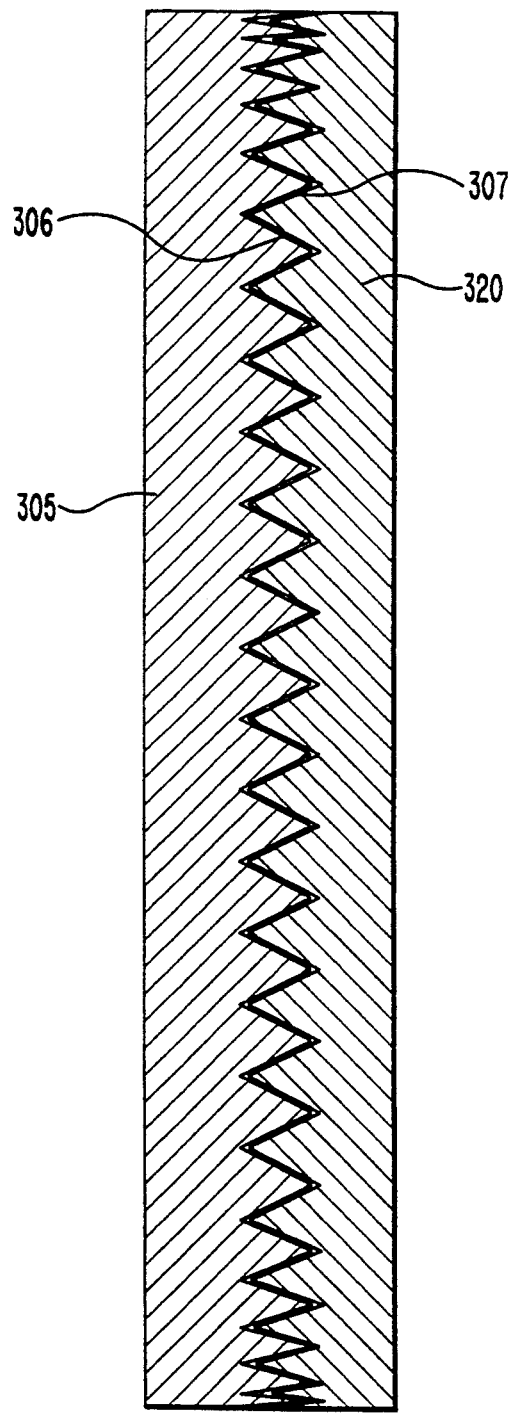
FIG. 3d depicts another preferred embodiment of opposing ratchet faces used in the in-hub brake.

FIG. 3d depicts an alternative preferred embodiment of the ratchet forces 306 and 307. The ratchet faces 306 and 307 in this embodiment are saw-tooth shaped for firm, positive engagement but more trouble free engagement than square ratchet faces.

Figure 3E:
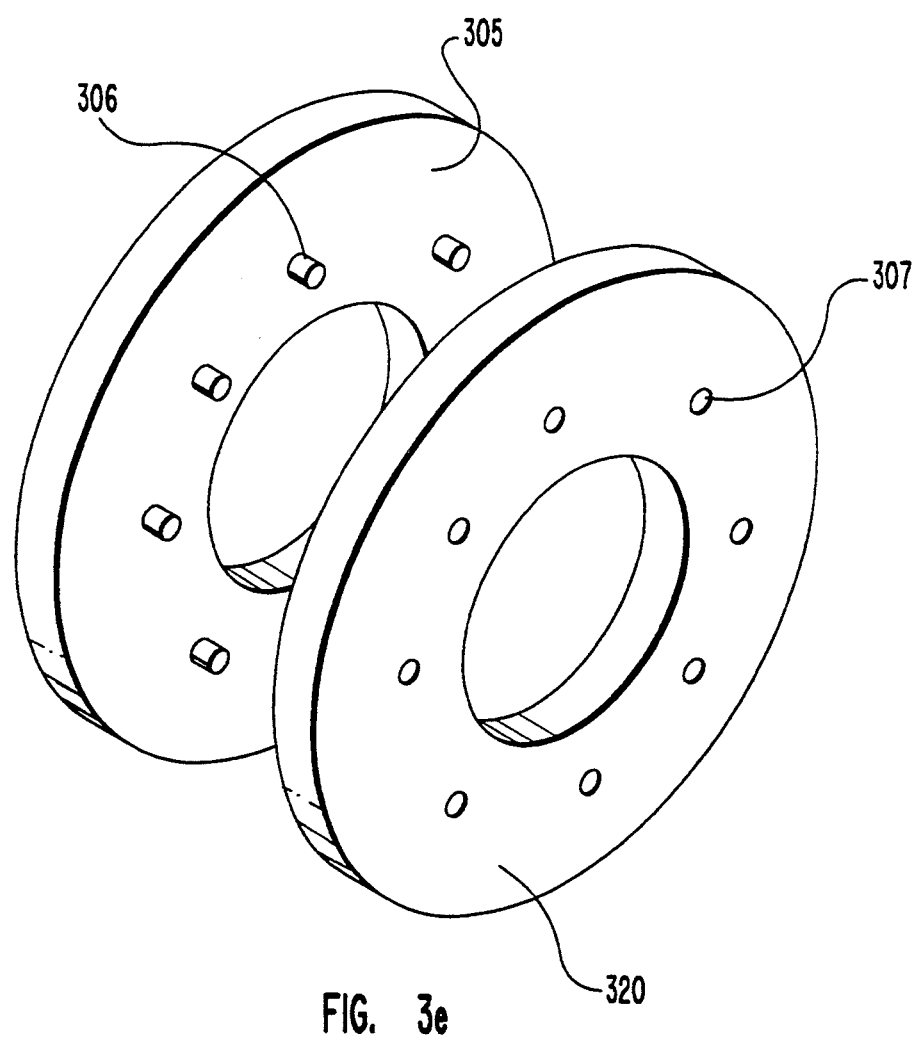
FIG. 3e depicts another preferred embodiment of opposing ratchet faces used in the in-hub brake.

FIG. 3e depicts an alternative preferred embodiment of the ratchet faces 305 and 306. In this embodiment, the ratchet faces are actually pins 306 engageable with holes 307, providing a firm, locking brake engagement. Various other designs of ratchet faces 306 and 307 could be used in other embodiments of the invention. For example, a flexible friction pad and a steel disc or drum (as in prior art automobile brakes) or two matching rubber surfaces, could be used.

In the preferred embodiment depicted in the drawing, a hexagonal axle is used, although axles of other shapes could be used in other embodiments of the invention. A hexagonal axle permits secure engagement of axle with sliding ratchet, preventing any slip between them. A keyed round axle, or any other axle engageable to the bearings and sliding ratchet without slip would be adequate. The sliding ratchet 305 must be firmly attachable to the axle 302 so that locking the sliding ratchet 305 by engagement of the ratchet faces 306 and 307 also locks the axle 302 and the corresponding wheel. In the preferred embodiment a hexagonal axle accomplishes this although any manner of securing the sliding ratchet 305 to the axle 302 could be used. Rotation of the axle relative to the wheelchair frame is prevented in the preferred embodiment by mounting the axle into a hexagonal receiver on the wheelchair's frame. Various other methods for fixing the axle relative to the wheelchair's frame could be used as well.

C. WEDGE-BOTTOM SPOKES

Figure 4:
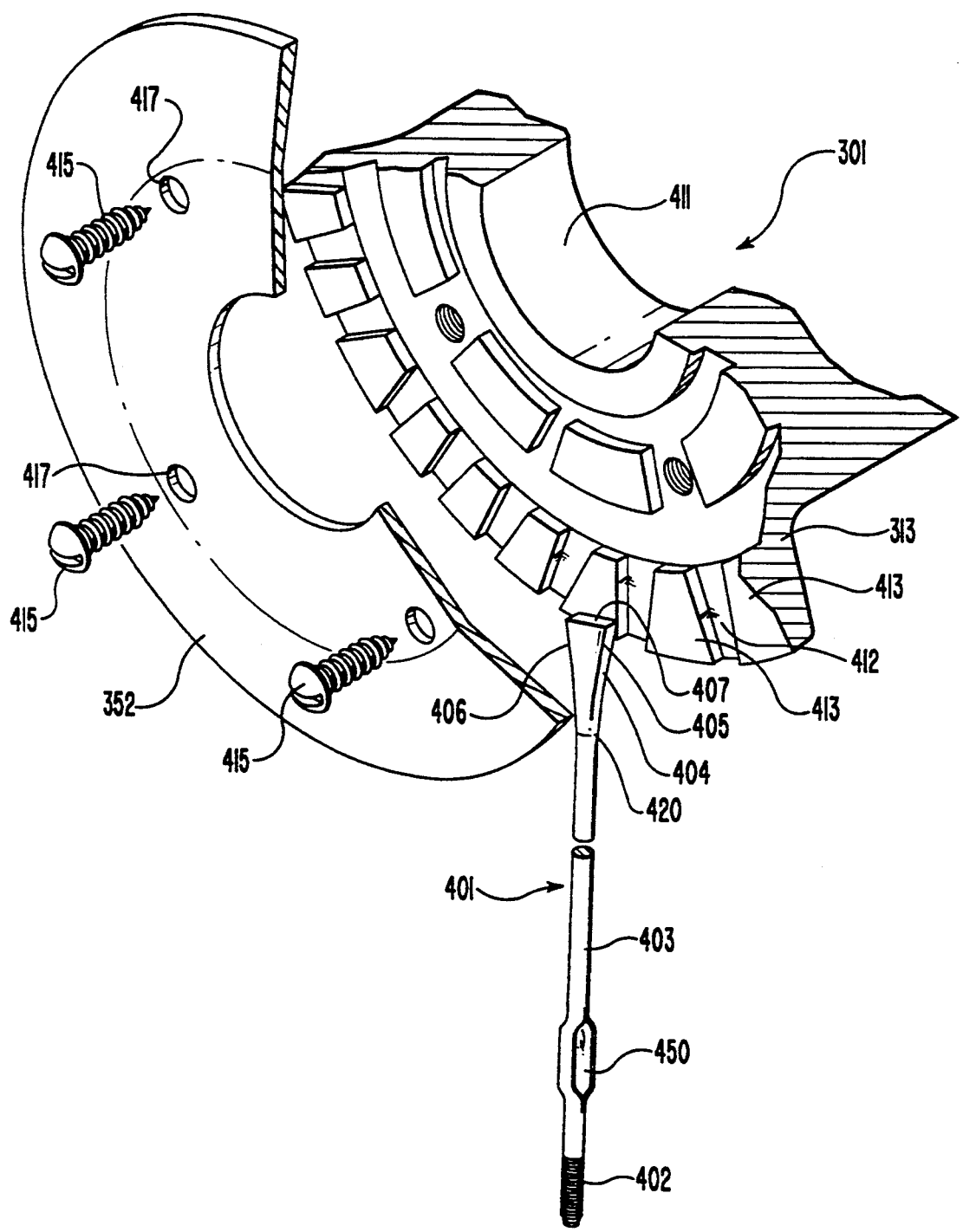
FIG. 4 depicts a wheelchair wheel hub, hubcap and wedge-bottom spoke of one preferred embodiment of the invention.

FIGS. 4 shows a preferred embodiment of a wedge-bottom spoke of the invention in parts-explosion format with a wheel hub and hub cap. The spoke 401 includes threads 402 for attachment to a wheel at the rim end of the spoke 401, a shaft 403 with a longitudinal axis, and a wedge bottom 404 for attachment to a wheel hub at the hub end of the spoke 401, opposite or at the other end of the shaft 403 along the spoke's longitudinal axis from the rim end and threads 402. Key to the invention is the wedge bottom feature. The shaft 403 is circular in cross section for most of its length and about 0.080 inches in cross-sectional diameter. As the shaft 403 nears the wedge bottom 404 it makes a transition from being round in cross section to being rectangular in cross section at about 420. The transition occurs along about 0.20 inches of shaft 403 length. The spoke 401 also includes a wrench flat 450 for insertion of a tool to prevent rotation of the spoke 401 about its longitudinal axis when installing it on a rim.

The sides of the wedge bottom 405 and 406 deviate outwardly from the longitudinal axis of the shaft 403 to form a wedge approximately 0.100 inches wide, in contrast to typical shaft 403 width of 0.80 inches. This deviation occurs over about the last 0.40 of shaft 403 length. Spoke bottom 407 is a straight edge at 90° to the longitudinal axis of the shaft 403. The spoke 401 attaches to a hub 301 on protruding lip 313. The hub 410 has a central receptacle 411 for axle bearings. A plurality of wedge receptacles 412 are provided, each having a wedge holder 413 on each side to positively lock the wedge bottom 404 of a spoke 401 in place by meeting the sides 405 and 406 of the wedge bottom 404 at a complimentary angle. Pins 415 are provided for attachment of a hub cap 416 having a plurality of holes 417. The spokes are held in place on the hub 410 by the flat hub surface, the shape of the wedge holders 413 complimentary to the spoke wedge bottoms 404 and by the hub cap 352.

Typical prior art hubs have a flange in the same plane as the tire and rim, the flange having small holes to receive spokes. Spokes are fed through these hub holes and secured at their opposite ends to the rim. Prior art spokes have a right-angle bend near the hub end, with a head that prevents the spoke from being pulled completely through the hub holes. The right angle bend of prior art spokes causes significant bending stress in the spoke at the bend. This bending stress and the need to insert the spoke through a hole are the principle reasons that steel, although very heavy, is the general material of choice in spokes. Aluminum fatigues too easily under such bending stresses. Injection molded short fiber composite can have a tendency to be cut by the hub if the holes in the hub are not rounded and smooth.

The spoke of the present invention is manufactured from all composite material such as fiber reinforced plastic. The invention replaces a spoke with a 90° bend with a molded-in wedge end 404 for attachment to a hub. This wedge end fits between two wedge holders on a hub for positive retention. When the spoke is tensioned, the wedge end interlocks with the wedge holders, each bearing against one another, resulting in the spoke being held securely at the hub without any bending stress and without any sharp surface which might cut it. Threads at the rim end of the spoke are used to secure the spoke to the wheel with nipples (nuts) just as in typical prior art spokes. In the preferred embodiment, a hub cap is placed on the hub over the wedge ends to ensure that none of them work out of the wedge receptacles sockets over time.

The spokes may be injection molded in the preferred embodiment from materials such as those used to manufacture the hub and push ring. Intermediate modulus high strength fiber is preferred in the composite materials, however, to achieve the desired strength and stiffness characteristics for wheel spokes.

An important feature of the invention is the use of wedges on the spokes and wedge sockets in the hub to eliminate spoke bends and associated bending stress and to eliminate spokes bearing on sharp surfaces. This design enables spoke manufacture from composite materials. Advantages of the preferred embodiment of the invention include very light weight, fatigue resistance (an inherent property of composite materials which is enhanced by not having a bend in the spoke), shock absorption (composite materials such as carbon-fiber-reinforced-plastic are well known for their shock and vibration dampening characteristics), and easier wheel assembly (no need to thread spokes through holes). In alternative embodiments, other materials such as steel or aluminum could be used for spoke manufacture.

The application for the wedge-bottom spoke described herein is in the field of wheelchair wheel assemblies. The spoke has application, however, throughout the entire wheel field whenever a lightweight, inexpensive, durable, shock-absorbent and fatigue-resistant wheel is desired. For example, the spoke would be desirable for use on bicycles because of its beneficial qualities.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A lightweight wheel assembly comprising:
   (a) a rim,
   (b) a wheel hub comprising a hollow cylindrical shell having an interior and an exterior, said hub interior being adapted for receiving brake components therein,
   (c) a plurality of spokes attachable to said rim and to said wheel hub, each of said spokes comprising:
      (i) a shaft having a longitudinal axis,
      (ii) means for attaching the spoke to said rim at the rim end of the spoke, and
      (iii) means for attaching the spoke to said wheel hub at the hub end of the spoke,
   (d) a push ring comprising:
      (i) a generally circular ring portion having a cross section comprising a body portion and two protruding side portions attached to said body portion to form a gap between said side portions, the cross section being at a 90 degree angle to a tangent at a point on said circular ring, and
      (ii) means for attaching said ring portion to said rim, wherein said push-ring is mountable to said rim, and
   (e) a static brake comprising:
      (i) an axle projectable through said wheel hub, said axle being mountable in a fixed position with respect to a wheelchair frame,
      (ii) bearings installable at said wheel hub about said axle, said wheel hub being rotably movable with respect to said axle on said bearings, and
      (iii) means for exerting a positive-engaging static braking force on said wheel hub interior and locking said wheel hub in a fixed position with respect to said axle;

wherein the components of said static brake are substantially contained within said wheel hub.

2. A lightweight wheel assembly for use on a wheelchair comprising:
(a) a wheel rim,
(b) a wheel hub comprising a hollow cylindrical shell having an interior and an exterior, the interior of said hollow cylindrical shell being adapted for receiving brake components therein, said wheel hub further comprising a plurality of wedge receptacles,
(c) a plurality of spokes for use in connecting said wheel rim to said wheel hub, at least one of said plurality of spokes comprising:
(i) a shaft having a longitudinal axis,
(ii) means for attaching the spoke to said rim at the rim end of the spoke, and
(iii) a wedge end at the hub end of the spoke for attaching the spoke to one of said wedge receptacles of said wheel hub,
wherein said wedge end comprises two wedge sides, each wedge side extending in generally the same direction as the longitudinal axis and each wedge side deviating slightly in an angular fashion from the longitudinal axis to form a wedge shape at the hub end of the spoke;
wherein the spoke is attachable to said wheel hub by placing its wedge end into a wedge receptacle, the wedge receptacle having two wedge holders shaped to mate with said wedge sides at a complimentary angle to said wedge sides; and
wherein said spokes are made from composite material;
(d) a push ring comprising:
(i) a generally circular ring portion having a cross section comprising a body portion and two protruding side portions attached to said body portion to form a gap between said side portions, the cross section being at a 90 degree angle to a tangent at a point on said circular ring, and
(ii) attachment tabs for attaching said ring portion to said wheel rim; wherein said ring portion is made from injection-molded composite materials; and
(e) a static wheelchair brake comprising:
(i) an axle projecting through the hollow cylindrical shell of said hub, said axle being mounted in a fixed position with respect to a wheelchair frame,
(ii) bearings installable at said wheel hub about said axle, said wheel hub being rotatably movable with respect to said axle on said bearings,
(iii) a ratchet slidably but not rotably mounted on said axle, said ratchet having braking faces which are positively engageable with corresponding braking faces on said hub to lock said hub in a fixed position with respect to said axle to provide a static braking force;
wherein the components of the wheelchair brake are substantially contained within said hub.

3. A static wheelchair brake comprising:
(a) a wheelchair wheel hub comprising a hollow cylindrical shell having an interior and an exterior, said wheel hub interior being adapted for receiving brake components therein,
(b) an axle projecting through said hub, said axle being mounted in a fixed position with respect to a wheelchair frame,
(c) bearings installable at said wheel hub about said axle, said wheel hub being rotably movable with respect to said axle on said bearings, and
(d) a ratchet slidably mountable on said axle, said ratchet having a plurality of braking faces which are positively engageable with corresponding wheel hub braking faces to lock said hub in a fixed position with respect to said axle to provide a static braking force;
wherein when the brake is in a disengaged state, a spring maintains said ratchet in a position such that said ratchet braking faces are not in contact with said corresponding wheel hub braking faces.

4. A brake as recited in claim 3 wherein the components of the wheelchair brake are substantially contained within said hub.

5. A brake as recited in claim 3 wherein said hub is made from composite material.

6. A brake as recited in claim 3 wherein said hub is made from fiber-reinforced plastic.

7. A brake as recited in claim 3 wherein said hub is adapted to receive wedge-bottom spokes.

8. A brake as recited in claim 3 wherein said hub is injection molded.

9. A brake as recited in claim 3 wherein said axle has a plurality of flat sides.

10. A brake as recited in claim 3 wherein said braking faces on said ratchet are disengaged from said braking faces on said hub when said brake is disengaged so that said brake imposes no interference with wheelchair wheel rotation when said brake is disengaged.

11. A static wheelchair brake comprising:
a hub of a wheelchair wheel comprising a hollow cylindrical shell for receiving brake components and onto which a wheelchair wheel is mountable,
an axle projecting through said hub, said axle being mounted in a fixed position on a wheelchair frame,
bearings installable at said hub about said axle, said hub being rotably movable with respect to said axle on said bearings,
a ratchet slidably mounted but not rotably mounted on said axle, said ratchet having braking faces which are positively engageable with corresponding braking faces on said hub to lock said hub in a fixed position with respect to said axle to provide a static braking force;
wherein the components of the wheelchair brake are substantially contained within said hub.

12. A brake as recited in claim 11 wherein said braking faces are approximately square faces.

13. A brake as recited in claim 11 wherein said braking faces are saw-tooth faces.

14. A brake as recited in claim 11 wherein said braking faces are pin and hole faces.

15. A brake as recited in claim 11 wherein said hub braking faces are located on the interior of said hub and wherein said ratchet braking faces are located on the exterior of the sliding ratchet.

16. A brake as recited in claim 15 further comprising a rebound spring within said hub which exerts force between one of said bearings and said sliding ratchet to slide said sliding ratchet along said axle and disengage said braking faces, permitting said hub to rotate with respect to said axle.

17. A brake as recited in claim 16 wherein said brake imposes no interference with wheelchair wheel rotation when disengaged.

* * * * *